(12) United States Patent
Muller

(10) Patent No.: US 9,688,063 B2
(45) Date of Patent: *Jun. 27, 2017

(54) METHOD FOR FORMING AN ARTICLE HAVING A DECORATIVE SURFACE

(71) Applicant: 3M INNOVATIVE PROPERTIES COMPANY, St. Paul, MN (US)

(72) Inventor: Carlo A. Muller, San Martino (IT)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/071,614

(22) Filed: Mar. 16, 2016

(65) Prior Publication Data

US 2016/0193826 A1 Jul. 7, 2016

Related U.S. Application Data

(63) Continuation of application No. 12/280,071, filed as application No. PCT/US2007/004763 on Feb. 23, 2007, now Pat. No. 9,290,031.

(30) Foreign Application Priority Data

Feb. 23, 2006 (GB) .................... 0603596.8

(51) Int. Cl.

| B41F 15/12 | (2006.01) |
|---|---|
| B41M 1/12 | (2006.01) |
| B29C 51/02 | (2006.01) |
| C08G 18/40 | (2006.01) |
| C08G 18/73 | (2006.01) |
| B41M 7/00 | (2006.01) |
| B29C 51/08 | (2006.01) |
| B29C 51/14 | (2006.01) |
| B29C 35/08 | (2006.01) |
| B29K 23/00 | (2006.01) |
| B29K 33/00 | (2006.01) |
| B29K 55/02 | (2006.01) |
| B29K 67/00 | (2006.01) |
| B29K 69/00 | (2006.01) |
| B29L 31/00 | (2006.01) |

(52) U.S. Cl.
CPC .............. *B41F 15/12* (2013.01); *B29C 51/02* (2013.01); *B41M 1/12* (2013.01); *B41M 7/009* (2013.01); *B41M 7/0081* (2013.01); *C08G 18/4063* (2013.01); *C08G 18/73* (2013.01); *B29C 51/082* (2013.01); *B29C 51/14* (2013.01); *B29C 2035/0822* (2013.01); *B29C 2791/001* (2013.01); *B29C 2791/006* (2013.01); *B29C 2793/009* (2013.01); *B29C 2795/00* (2013.01); *B29K 2023/12* (2013.01); *B29K 2033/08* (2013.01); *B29K 2055/02* (2013.01); *B29K 2067/00* (2013.01); *B29K 2069/00* (2013.01); *B29L 2031/722* (2013.01); *Y10T 428/24802* (2015.01)

(58) Field of Classification Search
CPC ........................................................ B41M 1/12
USPC ......................................................... 264/510
See application file for complete search history.

(56) References Cited

U.S. PATENT DOCUMENTS

| 4,059,471 A | 11/1977 | Haigh |
|---|---|---|
| 4,202,663 A | 5/1980 | Haigh et al. |
| 4,356,230 A | 10/1982 | Emanuel et al. |
| 4,507,458 A | 3/1985 | Shiraki et al. |
| 4,650,533 A | 3/1987 | Parker et al. |
| 6,306,504 B1 | 10/2001 | Meixner et al. |
| 6,465,102 B1 | 10/2002 | Honigfort et al. |
| 6,607,831 B2 | 8/2003 | Ho |
| 6,933,014 B1 | 8/2005 | Wynne |
| 7,553,906 B2 | 6/2009 | Weikard et al. |
| 7,972,681 B2 | 7/2011 | Roys et al. |
| 2004/0018297 A1 | 1/2004 | Davidson et al. |
| 2004/0030086 A1 | 2/2004 | Schelhaas |
| 2004/0132909 A1 | 7/2004 | Weikard et al. |
| 2005/0209360 A1 | 9/2005 | Graichen |

FOREIGN PATENT DOCUMENTS

| DE | 3724743 | 4/1989 |
|---|---|---|
| DE | 10260269 | 7/2004 |
| EP | 0122611 | 10/1984 |
| EP | 0562282 | 9/1993 |
| EP | 0 799 681 | 10/1997 |
| EP | 11012340 A | 1/1999 |
| WO | WO 03/004545 | 1/2003 |
| WO | WO 2004/067599 | 8/2004 |

*Primary Examiner* — Larry Thrower
(74) *Attorney, Agent, or Firm* — Harold C. Knecht, III

(57) ABSTRACT

The invention refers to a method for forming an article having a decorative surface comprising:
a) screen printing an ink composition comprising a curable composition onto at least one major surface of a thermoformable polymeric sheet;
b) curing said curable composition to obtain a printed sheet having on at least one major surface an ink comprising a cured composition; and
c) thermoforming the printed sheet to obtain a decorated article,
wherein said curable composition comprises a polyisocyanate and a component comprising isocyanate reactive groups and wherein said ink composition contains a solvent or solvent blend in which said curable composition is soluble or miscible.

20 Claims, No Drawings

METHOD FOR FORMING AN ARTICLE HAVING A DECORATIVE SURFACE

CROSS REFERENCE TO RELATED APPLICATIONS

This application is a continuation of U.S. application Ser. No. 12/280,071, filed May 4, 2010, which is a national stage filing under 35 U.S.C. 371 of PCT/US2007/004763, filed Feb. 23, 2007, which claims priority to Great Britain Application No. 0603596.8, filed Feb. 23, 2006, the disclosures of which are incorporated by reference in their entireties herein.

INVENTION FIELD

The present invention relates to a method for forming an article having a decorative surface using thermoforming.

The method of the present invention may find application in a variety of industries involving articles having a decorative surface. The method is particularly, but not exclusively, suitable for application in the automotive industry, including articles for all type of vehicles, i.e. cars, motorbikes, trucks, wherein tri-dimensional external decorated articles are desired. Decorated articles that can be produced with the method can be used in interior applications as well as in exterior applications where the decorated article is exposed to varying weather conditions of, for example, temperature, sunshine, humidity, etc . . . .

BACKGROUND

Methods for forming articles having decorative surfaces have been already described in the past. Within the last few years, a new decoration technique known as in-mold decoration (IMD) has gained acceptance and use in the molding industry and solves several of the problems associated with prior art techniques. See for example American U.S. Pat. Nos. 4,059,471; 4,650,533; 4,356,230 and 4,202,663. IMD combines the process of forming an article by injection molding with decoration of the article. In this method, a plastics carrier sheet, bearing a printed image, is placed in the cavity of an injection molding tool. Molten thermoplastic resin is then injected into the cavity to contact the carrier sheet. With suitable design of the injection molding tool, the pre-printed plastics carrier sheet becomes integral to the molded article or part. This is contrasted with the process described, for example, in European Patent application No. 799,681, where an image is transferred onto an article during the injection molding process. The molding process therein disclosed is a reaction injection molding, whereby reactive polymer components are injected into a mold at a relatively low temperature. The reactive components are mixed by injection and undergo a reaction, which raises the temperature of the mixture in the mold and produces hardened, cross-linked polymers.

The injection molding technique allows obtaining good results in terms of quality and precision also in case of decoration of articles having a complex shape. However, it has the disadvantage that it is very difficult and expensive to make modifications to the molds or any personalization to the printing process.

Another technique known in the art is the so-called thermoforming process, disclosed, for example, in the International Application No. 2004/067,599. It discloses flexible radiation curable compositions useful in thermoforming process which includes the steps of: 1) screen printing a polymeric sheet with a graphic design; 2) UV curing the printed ink; 3) thermoforming the printed sheets; 4) pressing the thermoformed sheet into a mold and applying vacuum; 5) cooling the product and removing it from the mold; 6) finishing the product to give it the final desired shape. The method therein described has the advantages to allow the ink to show good adhesion to the polymeric sheet, to avoid that prints stacked on top of each other stick to each other, to give the ink excellent flexibility and to allow successive interventions for aesthetical modification in the printing process. However, the decorated surface of the final product obtained by the method therein described has the disadvantage to show unpleasing cracks in the ink printed sheet, which aesthetically decrease its appearance for three-dimensional articles that include sharp angles. Additionally, the articles produced with the method disclosed in this international application, typically do not allow usage in exterior applications and in particular these articles do not satisfy stringent requirements that are imposed in the automotive industry.

INVENTION DESCRIPTION

The present invention can provide a method by which three-dimensional decorative articles can be produced in a cost effective and convenient way. The present method can also allow three-dimensional decorative articles to be formed that include sharp angles (e.g., angles of approximately 90 degrees, angles of less than 90, 85, 80, 75, 70, 65, 60, 55, 50 or 45 degrees, or even smaller angles) without the visible (i.e., with normal unaided human eyesight) appearance of cracking in the decorative design. In addition, the present method can allow three-dimensional decorative articles to be formed that result in the decorative design printed on the article from being substantially elongated (e.g., up to a percent elongation of 120%, 140%, 160%, 180% or even greater) without the visible (i.e., with normal unaided human eyesight) appearance of cracking in the decorative design. Furthermore, the present method can be employed in the production of articles suitable for use in exterior applications and capable of fulfilling the performance and aesthetic requirements that are typical in the automotive industry.

In one aspect, the invention relates to a method for forming an article having a decorative surface comprising:
a) screen printing an ink composition comprising a curable composition onto at least one major surface of a thermoformable polymeric sheet;
b) curing said curable composition to obtain a printed sheet having on at least one major surface an ink comprising a cured composition; and
c) thermoforming the printed sheet to obtain a decorated article,
wherein the curable composition comprises a polyisocyanate and a component comprising isocyanate reactive groups and wherein said ink composition contains a solvent or solvent blend in which said curable composition is soluble or miscible.

The article used in the method of the invention can be any article having a decorative surface used in the motor bike or automotive industry, in particular used as external articles, such as, for example, side or front mounted rearview mirror covers or housings, pillars, motorbike gas tank covers, head lamps, sunroofs, windows supports, or similar. The article can also be used in portions of the interior of, for example, a motor vehicle or other vehicle. Such vehicle interior portions can include, for example, parts of the instrumental panels, door traps or interior door trims, video display moldings, etc.

An advantage associated with the method of the present invention is that the article obtained with said method generally does not result in undesired visible cracks in the decorative design on the surface of the article, even if the decorative article has complex parts, shapes and/or sharp angles. The decorative articles also maintain the good properties of flexibility and adhesion of the decorative design to the polymeric sheet. Still further, the resulting decorative articles typically are useful in exterior application and fulfill the needs for automotive applications.

According to a particular embodiment of the present invention, it is believed that the ink composition can be allowed to partially penetrate into the thermoformable polymeric sheet, thereby improving the adhesion of the printed ink to the thermoformable sheet.

Screen printing is essentially a stencil printing process which may now be generated by computer with the aid of various software packages. Its ability to vary and control ink thickness accurately has made it an extremely useful process for the decoration of many different types of plastic substrates.

In screen printing, as disclosed for example in U.S. Pat. No. 6,465,102, a screen or stencil is prepared and bonded to a fine weave fabric which is then tensioned in a rigid frame. The basic screen-printing process involves, for example, the use of a flat bed where generally the substrate is held by vacuum during printing.

The screen printing step a) of the method may be repeated one or more times as needed, one for each color, depending on the number of desired color combinations to be printed on the decorated surface of the final article to obtain a desired full color decorated surface. It can be desirable to limit the number of times the screen printing step a) of the method is repeated, where the printed images at least overlap one on top of the other, in order to avoid interlayer adhesion problems resulting from image stacks that are too thick. It may be desirable to limit such printed image stacks to 5 or 6 layers (i.e., 5 or 6 printing steps) for the same decorative article.

Thermoformable polymeric sheets useful for receiving ink during the screen printing step a) according to the method of the present invention may be selected from conventional thermoplastic polymer material such as, for example, polycarbonate, polyesters, polyacrylates, polystyrene, polyethyleneterephthalate glycol (PETG), acrylonitrile butadiene styrene (ABS), thermoplastic polyolefin (TPO), polypropylene, acrylic compounds, and mixtures thereof. Due to superior mechanical and thermal properties, polycarbonate is preferred in the manufacturing of numerous part and components in the automotive industry. However, any other suitable thermoformable polymeric sheet may be used. The substrate may be a single layer structure or a multilayered structure.

The ink composition to be printed onto the thermoformable polymeric sheet during the screen printing step a) according to the method of the present invention contains at least a curable composition and a solvent or solvent blend in which the curable composition is soluble.

The curable composition comprises a polyisocyanate and a compound having isocyanate reactive groups. Suitable isocyanate reactive groups include hydroxyl groups and amino groups. In one embodiment of the invention, the compound having isocyanate reactive groups is a polymeric compound (e.g., a polymeric polyol). Generally, the compound having isocyanate reactive groups comprises at least two, generally at least three isocyanate reactive groups. Examples of compounds having isocyanate reactive groups include polyols, in particular acrylic or methacrylic homo- or copolymers having hydroxyl groups, for example having at least three hydroxyl groups. Further suitable isocyanate reactive compounds include polyolefins having isocyanate reactive groups, polyesters having isocyanate groups, polyurethanes having isocyanate reactive groups etc . . . . In a particular embodiment in connection with the present invention, the curable composition includes a caprolactone or caprolactone polyol (i.e., polycaprolactone) having isocyanate reactive groups, in particular having two or three hydoxy groups. More particularly, the curable composition can include a polyester polyol, derived from caprolactone monomer, terminated by primary hydroxyl groups. The molecular weight of the isocyanate reactive compound may vary widely and can be between 500 g/mol and 500,000 g/mol, for example between 1000 g/mol and 100,000 g/mol or between 10,000 g/mol and 80,000 g/mol. Simple low molecular weight compounds may be used as well such as for example alkane diols and alkane triols such as for example glycerol, butane diol and the like. The properties of the ink composition can be tailored by altering the molecular weight and/or the functionality of the curable composition.

The total amount of isocyanate reactive compounds in the ink composition is typically between 1 and 20% by weight based on the total amount of solids in the ink composition. A typical amount is generally between 2 and 15% by weight or between 3 and 10% by weight. Generally, the higher the amount of isocyanate reactive compounds for the same ratio of isocyanate to isocyanate reactive compounds, the less flexible the resulting cured ink may become, although the kind and nature of the polyisocyanate and isocyanate reactive compounds may influence the resulting flexibility as well.

The polyisocyanate used in the curable composition can aliphatic or aromatic. Generally the polyisocyanate compound is a di-isocyanate or tri-isocyanate. Polymeric or oligomeric isocyanate containing compounds may be used as well. Mixtures of different polyisocyanate compounds can be used as well. When a mixture of polyisocyanate compounds is used, the average amount of isocyanate groups per molecule will be more than 2 for example at least 2.2 or at least 2.5. Specific examples include toluene-diisocyanate, toluene-triisocyanate, 2,6-toluene diisocyanate, diphenylmethane diisocyanate, isophorone-diisocyanate, hexamethylene diisocyanate, xylene diisocyanate, among others. The amount of polyisocyanate compounds in the curable composition is typically such that at least a stoichiometric amount and preferably an excess of isocyanate groups to isocyanate reactive groups in the composition is present. However it is also possible to use less than a stoichiometric amount.

The ink composition generally will further include a synthetic resin (generally not containing an isocyanate reactive group) such as, for example only, polyester-based resins, polycarbonate-based resins, polyvinyl chloride-based resins, acrylic-based resins, polycaprolactones or similar. Mixtures of synthetic resins can be advantageously employed. The ink composition will generally also include dyes or pigments to obtain an ink having a desired color.

In a particular aspect of the invention, the ink composition may contain metallic pigments and/or mica. In a particular embodiment, the ink composition comprises a lactone or polylactone compound that may or may not have isocyanate reactive groups. The lactone or polylactone compounds suitable for use in accordance with the present invention advantageously has from about 3 to about 20 carbon atoms. Examples of suitable lactones include caprolactone, t-butyl caprolactone, zeta-enantholactones; delta-valerolactones; monoalkyl-delta-valerolactones, such as the monomethyl-, monoethyl-, and monohexyl-delta-valerolactones, and the like; monoalkyl, dialkyl, and trialkyl-epsilon-caprolactones such as the monomethyl-, monoethyl-, monohexyl-, dimethyl-, di-n-hexyl, trimethyl-, triethyl-epsilon-caprolactones, 5-nonyl-oxepan-2-one, 4,4,6- or 4,6,6-trimethyl-oxepan-2-one and the like; 5-hydroxymethyl-oxepan-2-one; beta-lactones, for example, beta-propiolactone; beta-butyrolactone or pivalolactone; gamma-lactones, such as gamma-butyrolactone; dilactones, such as lactide; dilactides; glycolides, such as tetramethyl glycolides, and the like; dioxanones, such as 1,4-dioxan-2-one, 1,5-dioxepan-2-one, and the like. The lactones can be the optically pure isomers or two or more optically different isomers or other mixtures. Epsilon-caprolactone and its derivatives, for example, methyl-epsilon-caprolactone, and other seven membered ring lactones are especially preferred.

Suitable solvents or solvent blends for use with the ink composition include those selected from ketones, such as, for example, cyclohexanone, isophorone, diacetone alcohol, acetophenone, di-isobutyl ketone; esters, such as for example, methoxypropyl acetate, isopropoxyethyl acetate, diethylene glycol ethyl ether acetate, ethylene glycol butyl ether acetate, ethoxyethyl propionate, ethyl lactate, isopropoxyethyl acetate, ethoxypropyl acetate, dimethyl succinate, dimethyl glutarate, dimethyl adipate, butoxyethyl acetate; and amides, such as for example, N-methylpyrrolidone. A mixture of these solvents may also be used.

In a particular embodiment, the solvent used is cyclohexanone. In particular, it is believed that the use of cyclohexanone as a solvent and the use of the polycarbonate as thermoformable polymeric sheet has the advantage to greatly improve the penetration into the thermoformable polymeric sheet of the ink material containing the ink composition and the solvent in which the ink composition is soluble. Specific examples of polycarbonate materials that can be used for the thermoformable polymeric sheet include, but are not limited to: Makrofol® polycarbonate sheets, available from Bayer AG (Darmstadt, Germany). It can be particularly desirable (e.g., for Automotive applications) to use polycarbonate or other thermoformable polymeric sheets that have been adapted to be resistant against degradation caused by ultraviolet (UV) radiation such as, for example, Makrofol® TP244, Makrofol® 1099UV or GE Lexan SLX. When the thermoformable polymeric sheet is transparent and the ink image is printed on the backside of the polymeric sheet, the top surface (i.e., opposite to the printed ink) can be UV protected. Protecting against UV radiation can significantly improve the durability of the printed ink image and the thermoformable plastic sheet.

The following components may also be added to the ink composition: matting agents, surfactants, stabilizers, plasticizers, extenders, biocides, and similar.

The total amount of solids in the ink composition may vary widely but is generally between 15% by weight and 60% by weight, for example between 20% by weight and 45% by weight or between 22 and 40% by weight.

The ink composition is screen-printed on one or both major sides of the thermoformable sheet. In one particular embodiment the ink composition is screen printed on the back side of the thermoformable sheet, i.e. the side opposite to the side that will define the exterior surface of the decorative article. In such a case, if the decoration involves an image, the image would be printed in reverse. In an alternative embodiment, the ink composition is printed on the side that forms the exterior surface of the decorative article and the image would thus be exposed on the surface of the decorative article. In such a case, it will generally be advantage to apply a clear coat on top of printed ink layer(s). Such a clear coat would serve as a protective layer (e.g., to provide abrasion resistance) and would typically be based on a curable composition, for example similar to the curable composition included in the ink composition. Generally, the clear coat may be applied by screen printing as well, for example as a final printing after all ink layers have been printed. The clear coat may also be provided as a continuous layer overlaying printed as well as non-printed layers. According to yet a further embodiment, the ink composition is printed on both sides of the thermoformable sheet. This allows for obtaining special graphical effects that may desired in a particular application such as, for example, an image or graphic including glossy printing overlaid with matte printing designs.

The curing step b), according to the method of the present invention, typically involves a cross-linking reaction of the polyisocyanate and the compound having isocyanate reactive groups. Typically, the curing is heat activated, for example, by irradiation of the printed sheet with infrared light A catalyst for accelerating the curing of the curable composition may also be used in the ink composition such that less energy will be required to activate the cross-linking reaction.

Typically, the curing step involves heat activation to a temperature of up to 90° C., up to 120° C. or even more, depending on the materials chosen. It can be desirable for the curing step to involve heat activation to a temperature of, for example, from 30° C. to 80° C. or from 40° C. to 60° C. Varying temperature profiles may be used to cause curing. Also, generally heat activation should proceed for a time sufficient to obtain a desired level of curing such that a subsequent color can be printed without blending the different colors together. Depending on the ink composition, this time can be between for example 0.5 and 5 minutes. Further, subsequent of the printing of the different colors, a further heat activation may be employed to fully cure the curable composition in the ink composition(s). Generally, this further heat activation will take at least 30 minutes, for example at least one hour and may be up to several hours. A full cure may also take several days (e.g., 3 days). Also, a higher temperature may be used in this further heat activation and curing.

Then, the printed and cured sheets are optionally stacked and transported to another location for being subjected to the thermoforming step c).

The thermoforming step c) is generally performed by inserting the ink printed sheets into a thermoforming machine and then heating them by infrared or other radiant heat source to soften the polymeric sheet, with the temperature and time of the heating operation dependent upon the type of thermoforming polymeric sheet.

The ink printed sheets are inserted in the thermoforming machine and therein maintained in a fixed position, for example by clamping them, in order to allow a uniform thermoforming step.

When the sheet is sufficiently soft, a mold may be pressed into the printed side (or optionally into the unprinted side) of the sheet and, due to the flexibility that the sheet is obtained in consequence of the thermoforming step, the sheet is allowed to tightly wrap the mold form, taking on its shape permanently. In a particular embodiment, the sheet is pressed between a male and female component of a mold. Vacuum is generally applied to allow the sheet to better wrap the mold.

After the sheet has obtained its shape, cooling air is conveniently applied to harden the sheet and to allow it to reach a solid shape.

The thermoformed sheet is then removed from the thermoforming machine and subjected to the final finishing step by cutting it, for example by a die-cutting device, to give it the final shape.

The finished decorated article exhibited good scratch resistance, and maintain excellent adhesion to the polymeric sheet.

The finishing step of the method of the present invention may further include the step of applying a transparent coat to the decorative surface as a protective layer as disclosed above.

The invention is further illustrated with reference to the following examples without the intention however to limit the invention thereto.

EXAMPLES

Materials for the Ink Composition Examples 1 and 2

D7900: Clear base ink for preparing desired colored inks commercially available from 3M Company. The clear base ink is based on a PVC resin and acrylic resin and containing a solvent mixture of cyclohexanone, aromatic solvents and ethylene glycol butyl ether acetate.

P1 and P2: pigment dispersions commercially available from 3M Company and suitable for blending with D7900.

Joncryl™ 587: acrylic polyol commercially available from Johnson (Johnson Polymer LLC, Sturtevant, Wis. 53177-0902, US).

TONE™ 200: polycaprolactone diol commercially available from Dow (Dow, Midland, Mich. 48674, US).

HMDI: hexamethylene di-isocyanate, Desmodur™ N 3390 BA/SN, commercially available from Bayer (Bayer Material Science AG, 51368 Leverkusen, Germany).

CGS 80: thinner commercially available from 3M Company

The ink composition of Example 1, according to the invention, was prepared having the following composition:
a) 50 parts per weight D 7900;
b) 40 parts per weight of a pigment dispersion P1;
c) 0.87 parts by weight Joncryl™ 587;
d) 0.43 parts by weight of TONE™ 200;
e) 0.0002 parts by weight dibutyltindilaurate;
f) 1.8 parts by weight HMDI;
g) 5.7 parts by weight CGS 80.

The ink composition of Example 2, according to the invention, was prepared similar as the ink composition of Example 1 but using pigment dispersion P2 to achieve a differently colored ink.

Materials for the Ink Composition of Examples 3 and 4

D7900: Clear base ink for preparing desired colored inks commercially available from 3M Company. The clear base ink is based on a PVC resin and acrylic resin and containing a solvent mixture of cyclohexanone, aromatic solvents and ethylene glycol butyl ether acetate.

P1 and P2: pigment dispersions commercially available from Kiian S.p.a. Luisago, Italy with trade name Mank-ounian-Argon Thermoplus 49000 series and intended for blending with D7900 clear resin.

Joncryl™ 587: acrylic polyol commercially available from Johnson (Johnson Polymer LLC, Sturtevant, Wis. 53177-0902, US).

TONE™ 200: polycaprolactone diol commercially available from Dow (Dow, Midland, Mich. 48674, US).

HMDI: hexamethylene di-isocyanate, Desmodur™ N 3390 BA/SN, commercially available from Bayer (Bayer Material Science AG, 51368 Leverkusen, Germany).

Desmophen A450M PA/X: acrylic polyol available from Bayer (Bayer Material Science AG, 51368 Leverkusen, Germany).

CGS 80: thinner commercially available from 3M Company.

The ink composition of Example 3, according to the invention, was prepared having the following composition:
h) 30 parts per weight D 7900 clear resin;
i) 60 parts per weight of a pigment dispersion P1;
j) 0.83 parts by weight Joncryl™ 587;
k) 0.41 parts by weight of TONE™ 200;
l) 0.0002 parts by weight dibutyltindilaurate;
m) 0.4 parts by weight HMDI;
n) 0.46 parts by weight Desmophen A450M PA/X
o) 0.00035 parts by weight Zinc napthenate
p) 0.000029 parts by weight Dimethly polysiloxane
q) 5.7 parts by weight CGS 80.

The ink composition of Example 4, according to the invention, was prepared similar as the ink composition of Example 3 but using pigment dispersion P2 to achieve a differently colored ink.

Example A

1. Screen-Printing Step

A sheet of a clear polycarbonate Makrofol™ (available from Bayer AG, Germany) with a thickness of 200 µm was screen-printed, using a commercially available flat-bed screen-printer. The desired design was achieved by screen-printing in two steps using the ink compositions of Examples 1 and 2.

The printed sample was dried in a flat bed oven having four stations. This drying step was done after each color printing. The samples passed through the heating zones at a line speed of 5.5 m per minute. Total oven length was about 5.5 m. Temperature of the four heating zones were as follows: zone 1: 50° C., zone 2: 60° C., zones 3 and 4 room temperature ventilation, maximum temperature 35° C. After the second printing and drying cycle the obtained printed sample was cured at 60° C. for 2 h. The dried ink coating had a thickness of ca. 6 to 10 µm.

2. Thermoforming Step

The printed sheet as obtained above was applied to a Cannon vacuum thermoformer model number Forma™1200 (Corso Novara 179-27029 Vigevano (PV)-Italy), in such a way that the printed area was facing the male mold. The male mold was the downside part of the thermoforming equipment. When the sheet became flexible, the vacuum led to a wrap-up of the sheet around the outside of a male mold. The temperature of the polycarbonate's thermoforming process was around 145° C. (following ISO 360 method B50).

The thermoformed sample was then separated from the mold. The final form of the sample was achieved by cutting.

3. Testing

The resulting multicoloured polycarbonate part was visually inspected for cracks in the printed ink layer. No cracks were found in the printed image.

Comparative Example

Example A was repeated with the exception that an alternative ink, cured by another method, was employed. This ink was UV curable ink Dirasol™ 916/917_commercially available from SERICOL (Fujifilm Sericol UK Limited, Broadstairs, Kent CT10 2LE). The ink was applied as above and cured using UV lamps as recommended by the manufacturer.

The multicoloured polycarbonate part bearing the UV cured ink was visually inspected for cracking in the printed image. The image showed aesthetically unpleasing cracks in the ink layer that detracted from its appearance.

Materials for the Ink Compositions of Examples 5 to 9

1903: 3M™ Screen Printing Ink 1903 White, available from 3M Company (St. Paul, Minn., USA).

3000: Silberline SPARKLE SILVER® 3000-AR (SBR) Aluminum Pigment Paste available from Silberline, Inc. (Tamaqua, Pa., USA).

3122: Silberline SPARKLE SILVER® 3122-AR (SBR) Aluminum Pigment Paste available from Silberline, Inc. (Tamaqua, Pa., USA).

7900: 3M™ High™ Performance Ink, 7900, available from 3M Company (St. Paul, Minn., USA).

7922: 3M™ High™ Performance blue ink, 7922, available from 3M Company (St. Paul, Minn., USA).

7937: 3M™ High™ Performance yellow ink, 7937, available from 3M Company (St. Paul, Minn., USA).

CAPA® 2054: polycaprolactone diol, Solvay Caprolactones (Warrington, Cheshire WA4 6HB, United Kingdom).

CAPA® 3050: polycaprolactone, Solvay Caprolactones (Warrington, Cheshire, United Kingdom).

DBTDL: Dibutyltin dilaurate catalyst for polymerizing isocyanate reactions, available from PolySciences, Inc. (Warrington, Pa., USA).

Xylene solvent available from Shell Chemical Company (Houston, Tex., USA).

N-100: DESMODUR N 100 aliphatic polyisocyanate resin based on hexamethylene diisocyanate (HMDI) available from Bayer Material Science LLC (Pittsburgh, Pa., USA).

Tone™ 240: polycaprolactone diol, Dow Chemical Company (Midland, Mich., USA).

HMDI: hexamethylene di-isocyanate, Desmodur™ N 3390 BA/SN, commercially available from Bayer (Bayer Material Science AG, 51368 Leverkusen, Germany).

Each ink formulation of Examples 5 to 9 was made by mixing the corresponding components together as specified in Table 1. Each Example composition was thinned to approximately 2000 cps with diethyleneglycol monoethyl ether acetate solvent, available from Eastman Chemical Company (Kingsport, Tenn., USA). Then each formulation was silk screen printed onto 1000 micron thick Makrofol® 2099UV polycarbonate sheets, available from Bayer AG (Darmstadt, Germany). The ink was printed in a checker board pattern of 25 mm×25 mm squares. After printing, the sheets were dried in a forced air oven at 85° C. for 30 minutes. The sheets were then thermoformed as described above.

The percent elongation each sample experienced during thermoforming was calculated by measuring the change in length of each side of the squares after thermoforming. Percent elongation is defined as (new dimension/original dimension×100). Screen printed squares that most closely represented percent elongations of 120%, 140%, 160% and 180% were examined and the stress effects on each examined printed ink square after elongation (i.e., their appearance) was rated. The samples were examined for the following changes in ink appearance: color change, pinholes and cracking. The change in appearance of the squares was rated using a 9, 3, 1 and 0 rating system. Squares with very little or no change in appearance after thermoforming were rated a 9. Squares with some acceptable change (i.e., limited color change, limited pinholes, and no visible cracking) in appearance after thermoforming were rated a 3. Ink squares with unacceptable changes in appearance after thermoforming (i.e., noticeable color change, large pin holes and no visible cracking) were rated a 1. Ink squares that exhibited visible cracking after thermoforming were rated a 0. The results are shown in the Table 1 below.

TABLE 1

| | Examples (amounts are parts by weight) | | | | |
|---|---|---|---|---|---|
| | 5 | 6 | 7 | 8 | 9 |
| Components | | | | | |
| 7900 | 76.00 | 76.00 | 76.00 | — | 20.00 |
| 7922 | 16.00 | 16.00 | 16.00 | — | — |
| 7937 | — | — | — | — | 80 |
| 3122 | 5.00 | 5.00 | 5.00 | — | — |
| 3000 | 3.00 | 3.00 | 3.00 | — | — |
| 1903 | — | — | — | 100 | — |
| DBTDL, 10% in xylene | 0.05 | 0.05 | 0.05 | 0.05 | 0.05 |
| Tone ™ 240 | — | — | 5.00 | 5 | 34.19 |
| CAPA ® 2054 | 5.00 | — | — | — | — |
| CAPA ® 3050 | — | 5.00 | — | — | — |
| Admix 770 | — | — | — | — | — |
| N-75 | — | — | — | — | — |
| HMDI | 1.08 | 5.97 | 1.00 | 1 | — |
| N-100 | — | — | — | — | 6.38 |
| Elongation Performance | | | | | |
| 120% | 3 | 9 | 9 | 3 | 3 |
| 140% | 1 | 3 | 3 | 3 | 3 |
| 160% | 0 | 3 | 1 | 1 | 3 |
| >180% | 0 | 3 | 1 | 1 | 1 |

The invention claimed is:

1. A method for forming an article having a decorative surface comprising:
   a) screen printing an ink composition comprising a curable composition onto at least one major surface of a thermoformable polymeric sheet;
   b) curing said curable composition to obtain a printed thermoformable polymeric sheet having on at least one major surface an ink comprising a cured composition; and
   c) thermoforming the ink and the printed thermoformable polymeric sheet together to obtain a decorated article, wherein said curable composition comprises a polyisocyanate and a component comprising isocyanate reactive groups, and said ink composition contains a solvent or solvent blend in which said curable composition is soluble.

2. The method according to claim 1, wherein said component having reactive groups comprises an acrylic polymer having hydroxyl groups.

3. The method according to claim 1, wherein said polyisocyanate comprises a di-isocyanate or tri-isocyanate.

4. The method according to claim 1, wherein said solvent is selected from ketones, esters, amides, or mixtures thereof.

5. The method according to claim 1, wherein the solvent is selected from cyclohexanone, isophorone, diacetone alcohol, N-methylpyrrolidone, methoxypropyl acetate, isopropoxyethyl acetate, ethoxyethyl propionate, ethyl lactate, and mixtures thereof.

6. The method according to claim 1, wherein the curable ink material further comprises a caprolactone or polycaprolactone compound, optionally having two or more hydroxyl groups.

7. The method according to claim 1, wherein said thermoformable polymeric sheet is made of a material selected from the group comprising polycarbonate, polyethyleneterephthalate glycol (PETG), acrylonitrile butadiene styrene (ABS), thermoplastic polyolefin (TPO), polypropylene, acrylic compounds and mixtures thereof.

8. The method according to claim 1, wherein said thermoformable polymeric sheet is polycarbonate.

9. The method according to claim 1, wherein said curing step b) comprises heating of said printed sheet.

10. The method according to claim 1, wherein said method includes the step of allowing the ink composition to partially penetrate into the thermoformable polymeric sheet.

11. The method according to claim 1, wherein said curing step b) comprises heating the printed thermoformable polymeric sheet before said thermoforming.

12. The method according to claim 2, wherein said polyisocyanate comprises a di-isocyanate or tri-isocyanate.

13. The method according to claim 2, wherein said solvent is selected from ketones, esters, amides, or mixtures thereof.

14. The method according to claim 3, wherein said solvent is selected from ketones, esters, amides, or mixtures thereof.

15. The method according to claim 12, wherein said solvent is selected from ketones, esters, amides, or mixtures thereof.

16. The method according to claim 2, wherein the curable ink material further comprises a caprolactone or polycaprolactone compound, optionally having two or more hydroxyl groups.

17. The method according to claim 12, wherein the curable ink material further comprises a caprolactone or polycaprolactone compound, optionally having two or more hydroxyl groups.

18. The method according to claim 13, wherein the curable ink material further comprises a caprolactone or polycaprolactone compound, optionally having two or more hydroxyl groups.

19. The method according to claim 14, wherein the curable ink material further comprises a caprolactone or polycaprolactone compound, optionally having two or more hydroxyl groups.

20. The method according to claim 15, wherein the curable ink material further comprises a caprolactone or polycaprolactone compound, optionally having two or more hydroxyl groups.

* * * * *

UNITED STATES PATENT AND TRADEMARK OFFICE
CERTIFICATE OF CORRECTION

PATENT NO.          : 9,688,063 B2                      Page 1 of 1
APPLICATION NO.     : 15/071614
DATED               : June 27, 2017
INVENTOR(S)         : Carlo Angelo Muller It is certified that error appears in the above-identified patent and that said Letters Patent is hereby corrected as shown below:

In the Specification

Column 8
Line 23, delete "1 )" and insert -- 1) --, therefor.

Column 10
Line 37, delete "Tone TM" and insert -- ToneTM --, therefor.
Line 38, delete "CAPA ®" and insert -- CAPA® --, therefor.
Line 39, delete "CAPA ®" and insert -- CAPA® --, therefor.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*